United States Patent
Ko

(10) Patent No.: US 11,390,174 B2
(45) Date of Patent: Jul. 19, 2022

(54) AUXILIARY BATTERY ACCOMMODATING DEVICE FOR ELECTRIC VEHICLE

(71) Applicant: LG CHEM, LTD., Seoul (KR)

(72) Inventor: Dong-Wan Ko, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 295 days.

(21) Appl. No.: 16/624,823

(22) PCT Filed: Feb. 19, 2019

(86) PCT No.: PCT/KR2019/001997
§ 371 (c)(1),
(2) Date: Dec. 19, 2019

(87) PCT Pub. No.: WO2019/177274
PCT Pub. Date: Sep. 19, 2019

(65) Prior Publication Data
US 2020/0122590 A1     Apr. 23, 2020

(30) Foreign Application Priority Data

Mar. 12, 2018 (KR) .......................... 10-2018-0028609

(51) Int. Cl.
*B60R 16/04*     (2006.01)
*B60L 50/64*     (2019.01)
(Continued)

(52) U.S. Cl.
CPC ............... *B60L 50/64* (2019.02); *B60L 53/18* (2019.02); *B60L 53/80* (2019.02); *B60L 58/18* (2019.02); *H01M 10/42* (2013.01); *H01M 50/20* (2021.01)

(58) Field of Classification Search
CPC .......... B60L 50/64; B60L 50/00; B60L 50/66; B60L 50/60; B60L 50/50; B60L 53/00;
(Continued)

(56) References Cited

U.S. PATENT DOCUMENTS 6,147,596 A    11/2000  Tsuchiya et al.
7,501,793 B2 *  3/2009  Kadouchi ........... H01M 10/658
                                              320/150
(Continued)

FOREIGN PATENT DOCUMENTS

EP       0686550 A1    12/1995
EP     2 913 261 A1     9/2015
(Continued)

OTHER PUBLICATIONS

International Search Report (PCT/ISA/210) issued in PCT/KR2019/001997, dated May 29, 2019.
(Continued)

*Primary Examiner* — James M Dolak
(74) *Attorney, Agent, or Firm* — Birch, Stewart, Kolasch & Birch, LLP

(57) ABSTRACT

An auxiliary battery storage device stores an auxiliary battery that is used for performing cell balancing to a main battery adopted in an electric vehicle or supplying power to the main battery having low state of charge (SOC). The auxiliary battery storage device includes a case body formed in a box shape with a top portion that is open and an inner space in which the auxiliary battery is stored; a case body cover coupled to the case body to open or close the top portion of the case body; a terminal connection member fixed to an inner surface of the case body cover to contact a power terminal of the auxiliary battery when the top portion of the case body is closed by the case body cover; and a (Continued)

power cable configured to extend from the terminal connection member to the main battery.

12 Claims, 7 Drawing Sheets

(51) Int. Cl.
*B60L 58/18* (2019.01)
*B60L 53/80* (2019.01)
*B60L 53/18* (2019.01)
*H01M 10/42* (2006.01)
*H01M 50/20* (2021.01)

(58) Field of Classification Search
CPC .......... B60L 53/80; B60L 53/18; B60L 58/18; B60L 58/12; B60L 58/20; B60L 58/50; B60L 58/00; B60L 58/10; B60L 58/22; H01M 10/42; H01M 10/425; H01M 10/00; H01M 10/625; H01M 10/62; H01M 10/46; H01M 50/20; H01M 50/10; H01M 50/00; H01M 50/102; H01M 50/103; H01M 50/147; H01M 50/15; H01M 50/172; H01M 50/202; H01M 50/204; H01M 50/209; H01M 50/244; H01M 50/249; H01M 50/271; H02J 7/0014; H02J 7/00; H02J 7/0013
See application file for complete search history.

(56) References Cited

U.S. PATENT DOCUMENTS

| | | | | |
|---|---|---|---|---|
| 7,511,456 B2* | 3/2009 | Lee | ................... | H01M 10/486 |
| | | | | 320/135 |
| 8,146,694 B2* | 4/2012 | Hamidi | ................... | B60L 53/80 |
| | | | | 180/68.5 |
| 8,237,403 B2* | 8/2012 | Ishii | ................... | B60L 50/64 |
| | | | | 320/112 |
| 8,334,064 B2* | 12/2012 | Ooyama | ............. | H04M 1/0262 |
| | | | | 429/97 |
| 9,196,879 B2* | 11/2015 | Hayashi | ................ | H01M 50/60 |
| 9,472,793 B2* | 10/2016 | Kim | ................... | H01M 50/296 |
| 9,821,959 B2* | 11/2017 | Hognaland | ........... | B65G 1/0464 |
| 9,827,840 B2* | 11/2017 | Wen | ................... | H01M 50/20 |
| 9,827,865 B2* | 11/2017 | Zhou | ................... | B60L 53/80 |
| 10,553,850 B2* | 2/2020 | Lee | ................... | H01M 10/04 |
| 11,133,548 B2* | 9/2021 | Matte | ................... | H01M 50/543 |
| 11,189,891 B2* | 11/2021 | Fukushima | ................ | B60L 3/04 |
| 11,264,670 B2* | 3/2022 | Chi | ................... | H01M 50/262 |
| 2005/0242782 A1 | 11/2005 | Kadouchi et al. | | |
| 2006/0267545 A1 | 11/2006 | Lee et al. | | |
| 2010/0062324 A1 | 3/2010 | Ooyama | | |
| 2010/0114762 A1 | 5/2010 | Ishii | | |
| 2013/0108905 A1 | 5/2013 | Murakami et al. | | |
| 2016/0185243 A1 | 6/2016 | Zhou et al. | | |
| 2017/0025657 A1 | 1/2017 | Reinshagen et al. | | |
| 2017/0366019 A1 | 12/2017 | Sung et al. | | |
| 2019/0058183 A1 | 2/2019 | Lee et al. | | |

FOREIGN PATENT DOCUMENTS

| | | | |
|---|---|---|---|
| FR | 2871943 | A1 | 12/2005 |
| JP | 60-131963 | U | 9/1985 |
| JP | 61-22914 | U | 2/1986 |
| JP | 61-183057 | U | 11/1986 |
| JP | 7-37565 | A | 2/1995 |
| JP | 7-315780 | A | 12/1995 |
| JP | 9-274906 | A | 10/1997 |
| JP | 11-208388 | A | 8/1999 |
| JP | 11-341700 | A | 12/1999 |
| JP | 2001-229899 | A | 8/2001 |
| JP | 2004-179120 | A | 6/2004 |
| JP | 2006-296109 | A | 10/2006 |
| JP | 2013-97926 | A | 5/2013 |
| JP | 2014-147197 | A | 8/2014 |
| JP | 2015-106983 | A | 6/2015 |
| JP | 2015-164819 | A | 9/2015 |
| KR | 20-1997-0002224 | Y1 | 3/1997 |
| KR | 10-0356667 | B1 | 10/2002 |
| KR | 10-0903185 | B1 | 6/2009 |
| KR | 10-1304220 | B1 | 9/2013 |
| KR | 10-2014-0028350 | A | 3/2014 |
| KR | 10-1429747 | B1 | 8/2014 |
| KR | 10-2016-0046221 | A | 4/2016 |
| KR | 10-1647825 | B1 | 8/2016 |
| KR | 10-1674991 | B1 | 11/2016 |
| KR | 10-2017-0093577 | A | 8/2017 |
| KR | 10-1795829 | B1 | 11/2017 |
| WO | WO 2008/108091 | A1 | 9/2008 |
| WO | WO 2008/123543 | A1 | 10/2008 |

OTHER PUBLICATIONS

Extended European Search Report for Application No. 19766988.0 dated Oct. 15, 2020.
English Machine translation of KR-10-2016-0046221-A, published on Apr. 23, 2016.
English Machine translation of JP 2001-229899-A, published on Aug. 24, 2001.
European Office Action dated Jan. 3, 2022 for Application No. 19766988.0.

* cited by examiner

AUXILIARY BATTERY ACCOMMODATING DEVICE FOR ELECTRIC VEHICLE

TECHNICAL FIELD

The present disclosure relates to an auxiliary battery storage device, and more particularly, to a storage device capable of exchanging an auxiliary battery safety and conveniently.

The present application claims priority to Korean Patent Application No. 10-2018-0028609 filed on Mar. 12, 2018 in the Republic of Korea, the disclosures of which are incorporated herein by reference.

BACKGROUND ART

Generally, a battery module mounted on a high-output product such as an electric vehicle includes a plurality of cells connected in series or in parallel, since a high voltage is to be supplied to a load.

If the battery module including the plurality of cells is discharged, the state of charges (SOCs) of the cells become different from each other due to the difference in the self-discharge rate of the cells.

If the battery module is continuously discharged in a state where the SOC is unbalanced, certain cells having low SOC are overdischarged, which makes it difficult to stably operate the battery module.

Conventionally, in order to solve the SOC imbalance between the cells, a buck method for eliminating the SOC imbalance between the cells by discharging cells having relatively high SOC and a boost method for eliminating the SOC imbalance between the cells by charging cells having relatively low SOC have been widely used.

The buck method has a problem that energy is wasted during the cell balancing process, and the boost method has a disadvantage that the circuit design becomes complicated because a charge circuit must be connected to every cell.

Among known cell balancing methods, there is a method of using an auxiliary battery as disclosed in Korean Unexamined Patent No. 10-2014-0028350.

In the method of utilizing the auxiliary battery, the auxiliary battery is connected to cells having relatively high SOC, and the electric energy stored in the cells are discharged to charge the auxiliary battery. If so, the buck-type cell balancing is achieved, and energy is not wasted in this process.

Also, if the auxiliary battery is charged to some extent, the auxiliary battery is connected to cells having relatively low SOC to discharge the electric energy stored in the auxiliary battery so that the cells having relatively low SOC are charged. Then, unlike the existing boost method, it is possible to realize cell balancing by recycling the energy stored in the auxiliary battery even though there is no separate current source for generating the charging current.

However, the cell balancing method using the auxiliary battery has a problem that the auxiliary battery is rapidly degraded because the auxiliary battery is frequently charged and discharged. If the battery is degraded, internal resistance is increased to generate heat, and negative reaction occurs inside the battery to generate gas. Thus, if the auxiliary battery is degraded, safety of the cell balancing is deteriorated.

To solve this problem, the auxiliary battery should be exchanged periodically. However, in the conventional technology, since the auxiliary battery is installed in the exterior of the battery along with a plurality of cells, it is troublesome to disassemble the exterior of the battery in order to exchange the auxiliary battery. In particular, in the case of an electric vehicle, since the battery is mounted below a body frame, lifting equipment and maintenance experts are needed to lift the electric vehicle and exchange the auxiliary battery.

As a solution thereto, as disclosed in Korean Unexamined Patent Publication No. 10-2016-0046221, the auxiliary battery is moved to a bonnet or a rear trunk of the vehicle, and the auxiliary battery and the main battery module are electrically connected to each other using a power cable.

However, even though the auxiliary battery is installed in a space directly accessible to a driver, such as a car bonnet or a rear trunk, it is still not easy for an unskilled person to exchange the auxiliary battery due to space constraints, resultant complicated wiring and safety reasons.

DISCLOSURE

Technical Problem

The present disclosure is designed to solve the problems of the related art, and therefore the present disclosure is directed to providing an auxiliary battery storage device, which allows an auxiliary battery to be electrically connected to a main battery while the auxiliary battery is being stored so that the auxiliary battery may be easily exchanged even by an unskilled person.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an auxiliary battery storage device for storing an auxiliary battery that is used for performing cell balancing to a main battery adopted in an electric vehicle or supplying power to the main battery having low state of charge (SOC), the auxiliary battery storage device comprising: a case body formed in a box shape with an open top portion to have an inner space in which the auxiliary battery is stored; a case body cover coupled to the case body to open or close the open top portion of the case body; a terminal connection member fixed to an inner surface of the case body cover to contact a power terminal of the auxiliary battery when the top portion of the case body is closed by the case body cover; and a power cable configured to extend from the terminal connection member to the main battery.

The terminal connection member may include a protruding pin provided to be connected to or disconnected from the power terminal of the auxiliary battery in a receptacle manner.

The auxiliary battery storage device may further comprise a fastening member configured to fix the case body cover to the auxiliary battery, wherein the fastening member may be at least one bolt that has a gripping ring at a head portion thereof and is integrally connected to the case body cover and the auxiliary battery.

The case body may include a cable passage formed in at least one side plate thereof so that the power cable passes therethrough.

The case body cover may be hinged to one side plate of the case body, the cable passage may have two openings forming an entrance and an exit thereof so that the two openings are located at a top end and an outer side of the side plate, and the top end of the side plate at which the opening is located may be depressed down compared to other regions.

The case body may have hooking grooves formed in side plates thereof facing each other, and the case body cover may have hooking protrusions engaged with the hooking grooves so that the case body and the case body cover are coupled to each other, and the hooking protrusions may be respectively moved by an electromagnetic force to be engaged with or disengaged from the hooking grooves.

The case body cover may include an electromagnet disposed at a position spaced apart from the hooking protrusion by a predetermined distance to pull the hooking protrusion by an electromagnetic force to be disengaged from the hooking groove; and a spring configured to elastically bias the hooking protrusion toward the hooking groove so that the hooking protrusion is engaged with the hooking groove.

The hooking protrusion may include a jaw engaged with the hooking groove; and a stopper configured to extend opposite to the jaw to support an upper surface of the auxiliary battery downward.

The auxiliary battery storage device may further comprise a lifting unit configured to move the auxiliary battery up and down to a preset height in the case body.

The lifting unit may include a support plate formed with a table shape to support the auxiliary battery inside the case body; a lifting rod configured to vertically pass through a lower plate of the case body and be connected to the support plate; and a driving motor configured to move the lifting rod up and down.

In another aspect of the present disclosure, there is also provided an electric vehicle, comprising the auxiliary battery storage device described above.

Advantageous Effects

According to one embodiment of the present disclosure, since the auxiliary battery and the main battery may be electrically connected only by inserting the auxiliary battery into the case body and covering the case body by the case body cover, the auxiliary battery may be safely and easily exchanged even by an unskilled person.

According to another embodiment of the present disclosure, since the case body cover and the auxiliary battery are coupled to keep the gap therebetween constant, the electrical connection between the connector on the case body cover and the power terminal of the auxiliary battery may be stably maintained even when external shocks or vibrations are applied thereto.

According to still another embodiment of the present disclosure, it may become very easy to mount or separate the case body cover and to load or unload the auxiliary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

An auxiliary battery 3 mentioned in this specification may mean a battery used for performing cell balancing to a main battery 2 adopted in an electric vehicle 1 or supplying power to the main battery 2 with a low state of charge (SOC). For example, in the main battery 2, the auxiliary battery 3 discharges the electric energy stored in cells having relatively high SOC to equalize the SOC with the other cells, and the discharged electric energy is used to charge the auxiliary battery 3. In addition, the auxiliary battery 3 is connected to cells having relatively low SOC to discharge the electric energy stored in the auxiliary battery 3 so that the cells having relatively low SOC are charged to equalize the SOC with the other cells.

The auxiliary battery 3 may be installed at a location at which the auxiliary battery 3 may be easily maintained and easily exchanged at emergency separately from the main battery 2. An auxiliary battery storage device 5 may be understood as an article used to accommodate and store the auxiliary battery 3. The auxiliary battery storage device 5 according to the present disclosure may also be used to accommodate a fuel cell (serving for starting a general vehicle or supplying power to various devices) having a similar function and structure to the auxiliary battery 3.

Figure 1:
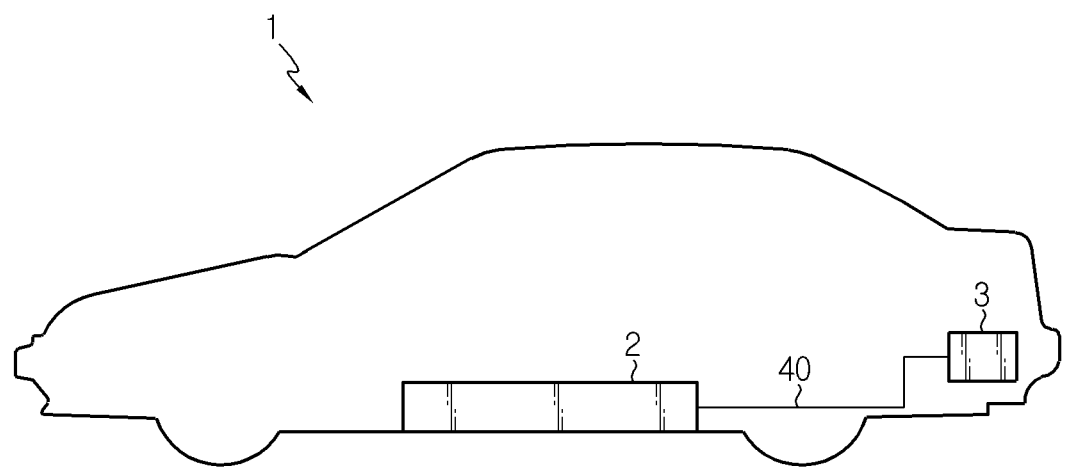
FIG. 1 is a diagram for schematically illustrating loading locations of an auxiliary battery and an auxiliary battery storage device according to an embodiment of the present disclosure.

As shown in FIG. 1, the main battery 2 may be coupled to a lower frame of the vehicle, and the auxiliary battery 3 may be mounted to a bonnet or a rear trunk of the vehicle.

The main battery 2 and the auxiliary battery 3 may be electrically connected through a power cable 40.

If the auxiliary battery 3 breaks down or has a trouble, a driver may open the bonnet or the rear trunk to exchange the auxiliary battery 3. The auxiliary battery storage device 5 according to the present disclosure is a device for casing the auxiliary battery 3, and when the auxiliary battery 3 is exchanged, a new auxiliary battery 3 may be accommodated in the auxiliary battery storage device 5 and simultaneously connected to the auxiliary battery storage device 5.

As will be described later in detail, if the auxiliary battery storage device 5 according to the present disclosure is used, a new auxiliary battery 3 is electrically connected to the main battery 2 only by mounting the new auxiliary battery 3 to the storage device. Thus, the auxiliary battery 3 may be exchanged safety and easily even by an unskilled person. Hereinafter, the auxiliary battery storage device 5 will be described in detail with reference to FIGS. 2 to 4.

Figure 2:
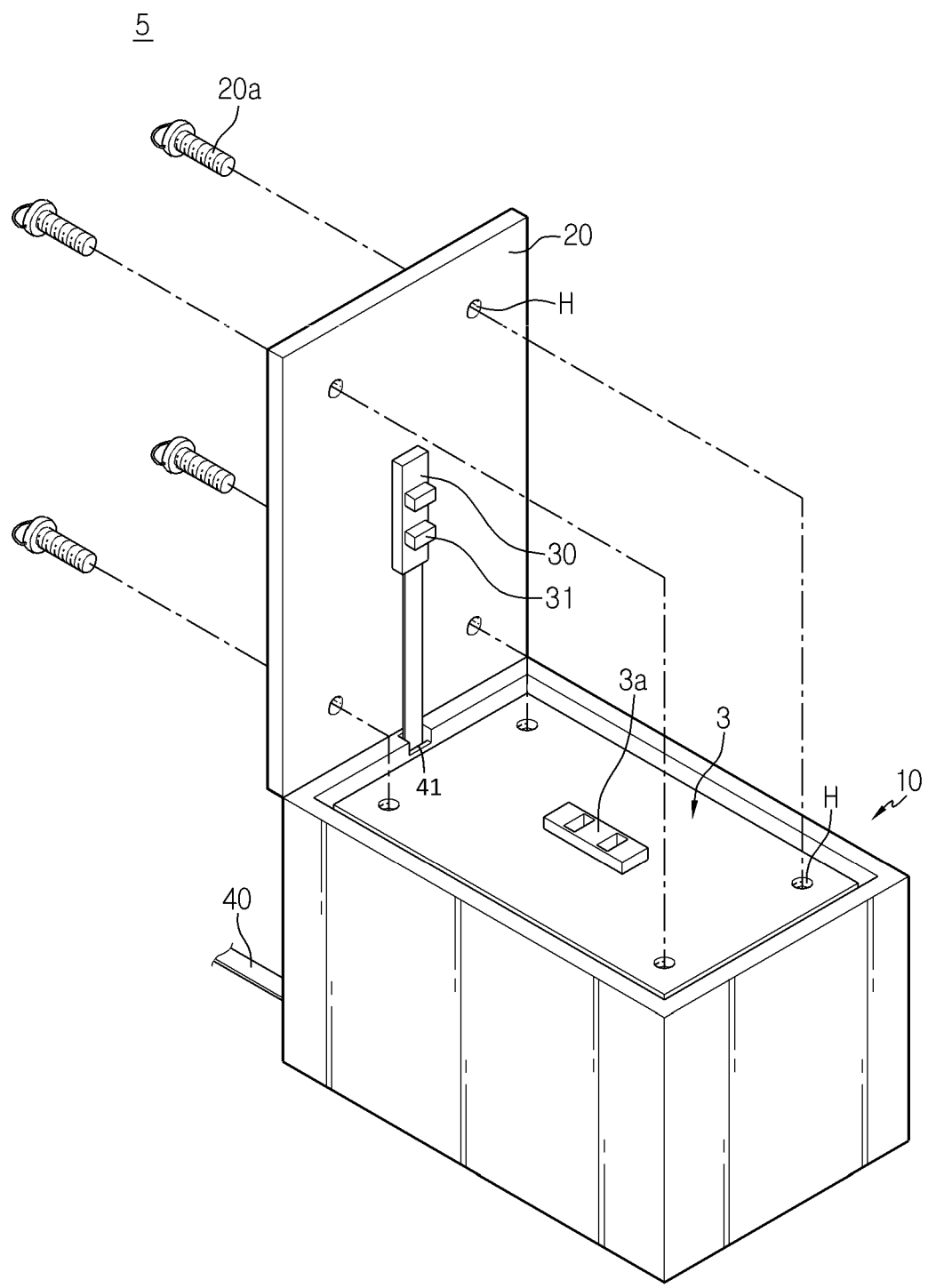
FIG. 2 is a perspective view schematically showing the auxiliary battery storage device according to an embodiment of the present disclosure.
Figure 3:
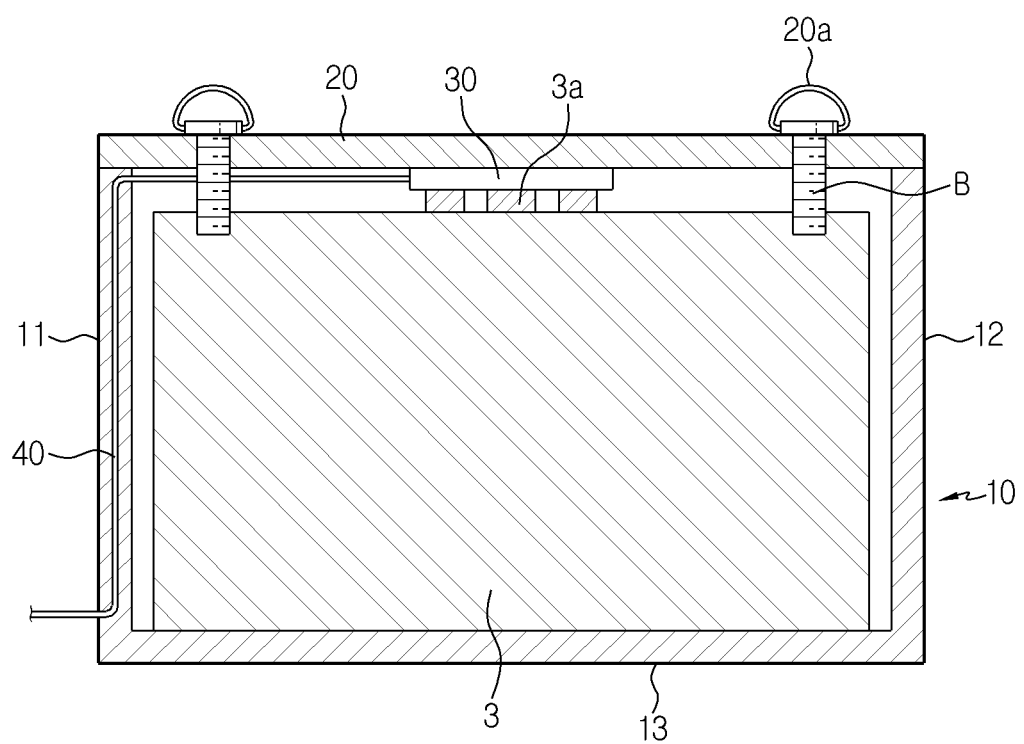
FIG. 3 is a cross-sectioned view schematically showing the auxiliary battery storage device according to an embodiment of the present disclosure.
Figure 4:
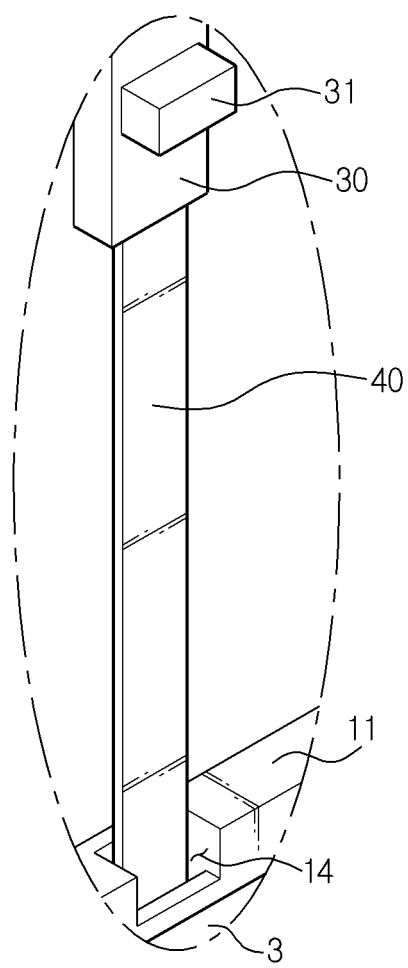
FIG. 4 is an enlarged view showing a power cable and an inlet of a cable passage of FIG. 2.

FIG. 2 is a perspective view schematically showing the auxiliary battery storage device according to an embodiment of the present disclosure, FIG. 3 is a cross-sectioned view schematically showing the auxiliary battery storage device according to an embodiment of the present disclosure, and FIG. 4 is an enlarged view showing a power cable and an inlet of a cable passage of FIG. 2.

Referring to FIGS. 2 to 4, the auxiliary battery storage device 5 according to an embodiment of the present disclosure includes a case body 10, a case body cover 20, a terminal connection member 30, and a power cable 40. The auxiliary battery storage device 5 may be disposed at, for example, a bonnet or a rear trunk.

The case body 10 may include a lower plate 13 and four side plates 11, 12 forming walls, and may be formed in a box shape with an open top portion.

The auxiliary battery 3 may be placed in the inner space formed inside the case body 10. At this time, a power terminal 3a of the auxiliary battery is provided to face the open top portion of the case body 10.

Though not shown in the figures for convenience, the lower plate 13 of the case body 10 may be fixed horizontally to a bottom surface of the bonnet or the trunk by a component such as a bracket.

The side plates 11, 12 of the case body 10 define the inner space of the case body 10. In particular, the side plates 11, 12 may be formed at least higher than the height of the auxiliary battery 3 so that the auxiliary battery 3 is fully inserted into the inner space of the case body 10. The auxiliary battery 3 accommodated in the case body 10 may be protected from external impact by the side plates 11, 12. Also, the side plates 11, 12 may be used as a wiring path of the power cable 40, explained later.

Meanwhile, in this embodiment, the case body 10 is designed to have a rectangular parallelepiped box shape, but the shape of the case body 10 may be changed depending on the volume or the installation place of the auxiliary battery 3.

The case body cover 20 is a component that closes the open top portion of the case body 10. The case body cover 20 according to this embodiment has a plate shape sized corresponding to the area of the open top portion of the case body 10 and is provided to be hinged to the case body 10.

For example, the case body cover 20 is rotatably coupled to any one side plate 11 of the side plates 11, 12 of the case body 10 by a hinge to open and close the top portion of the case body 10. That is, the top portion of the case body 10 may be opened or closed by rotating the case body cover 20.

A terminal connection member 30 serving as is a component electrically connected to the power terminal 3a of the auxiliary battery is fixedly coupled to an inner surface of the case body cover 20.

The terminal connection member 30 according to this embodiment may be configured as a male connector having protruding pins 31, and the power terminal 3a of the auxiliary battery may be configured as a female connector having a socket that may be coupled with the protruding pins 31 in a receptacle manner.

As shown in FIG. 3, the terminal connection member 30 may be disposed at a center of the inner surface of the case body cover 20 so that the terminal connection member 30 is connected to the power terminal 3a of the auxiliary battery when the top portion of the case body 10 is completely closed by the case body cover 20.

Thus, if the top portion of the case body 10 is closed by the case body cover 20, the protruding pins 31 of the terminal connection member 30 are connected to the power terminal 3a of the auxiliary battery, and if the case body cover 20 is opened, the protruding pins 31 of the terminal connection member 30 are disconnected from the power terminal 3a of the auxiliary battery.

The position of the terminal connection member 30 may be changed corresponding to the position of the power terminal 3a of the auxiliary device. Namely, the terminal connection member 30 may be located at any position on the inner surface of the case body cover 20 as long as the terminal connection member 30 contacts the power terminal 3a of the auxiliary battery when the top portion of the case body 10 is closed by the case body cover 20. In addition, the main and the female connectors may be connected in any way such as a point contact method other than the receptacle method, as long as the main and the female connectors can be contacted with each other.

Meanwhile, the auxiliary battery storage device according to the present disclosure may further include a fastening member 20a that fixes the case body cover 20 and the auxiliary battery 3 in a state where the top portion of the case body 10 is closed by the case body cover 20.

As the fastening member 20a, a bolt B may be employed having a gripping ring formed in a head portion thereof. As shown in FIG. 2 and FIG. 3, a bolt B may be inserted into bolt fastening holes H, which are provided in corner regions of the case body cover 20 and the auxiliary battery 3 in one-to-one relationship, to integrally fix the case body cover 20 and the auxiliary battery 3. At this time, a worker may grip the gripping ring and turn the bolt B, so that the bolt B may be tightened without using a tool such as a spanner.

In this way, as the case body cover 20 and the auxiliary battery 3 are fastened by the bolt, a gap may not be generated between the case body cover 20 and the auxiliary battery 3 even when shock or vibration is applied thereto while the vehicle is running. Thus, the contact state between the main and the female connectors 30, 5a may be stably maintained.

The power cable 40 is a component for electrically connecting the auxiliary battery 3 and the main battery 2 and allows the auxiliary battery 3 to be separated from the main battery 2 and placed in a trunk space that is easily accessible to the driver.

The power cable 40 is connected to the main battery 2 having one side connected to the terminal connection member 30 and the other side installed to the body frame. Thus, if the top portion of the case body 10 is closed by the case body cover 20, the power of the auxiliary battery 3 may be supplied to the main battery 2.

As shown in FIGS. 2 and 3, the power cable 40 according to this embodiment may extend from the terminal connection member 30 through the side plate 11 of the case body 10 to the outside of the case body 10 toward the main battery 2. To this end, the side plate 11 of the case body has a hollow structure in which a cable passage 41 is provided.

Two openings forming an entrance and an exit of the cable passage are respectively located at a top end and an outer side of the side plate 11 to which the case body cover 20 are hinged, and the cable passage may be formed to extend straightly downward from an inlet 14 located at the top end of the side plate 11 approximately to an outlet adjacent to a bottom end of the side plate 11.

The top portion of the side plate 11 where the inlet 14 of the cable passage is located may be depressed compared to regions other than the top portion. In other words, as shown in FIG. 4, the top portion of the side plate 11 corresponding to the inlet 14 of the cable passage may be concavely recessed relative to other portions.

Since the cable passage is provided in the side plate 11 of the case body 10 as described above, the interference between the power cable 40 and the auxiliary battery 3 in the case body 10 may be minimized. Also, when the top portion of the case body 10 is closed by the case body cover 20, the power cable 40 may not interfere with the case body cover 20 at all.

If the auxiliary battery storage device 5 according to the present disclosure having the above structure and operation is used, it is possible to protect the auxiliary battery 3 from external impact. Moreover, since the power terminal 3a of the auxiliary battery is connected to or disconnected from the power cable 40 by putting the auxiliary battery 3 into the case body 10 and opening or closing the case body 10 by the case body cover 20, it is not necessary to carry out the wiring work in a state of wearing safety equipment, different from the conventional art. Thus, the auxiliary battery 3 may be safely and easily exchanged even by an unskilled person.

Subsequently, an auxiliary battery storage device 5 according to another embodiment of the present disclosure will be described. The same reference numerals as those in the former embodiment denote the same components and will not be described in detail again, and features different from the former embodiment will be described in detail.

Figure 5:
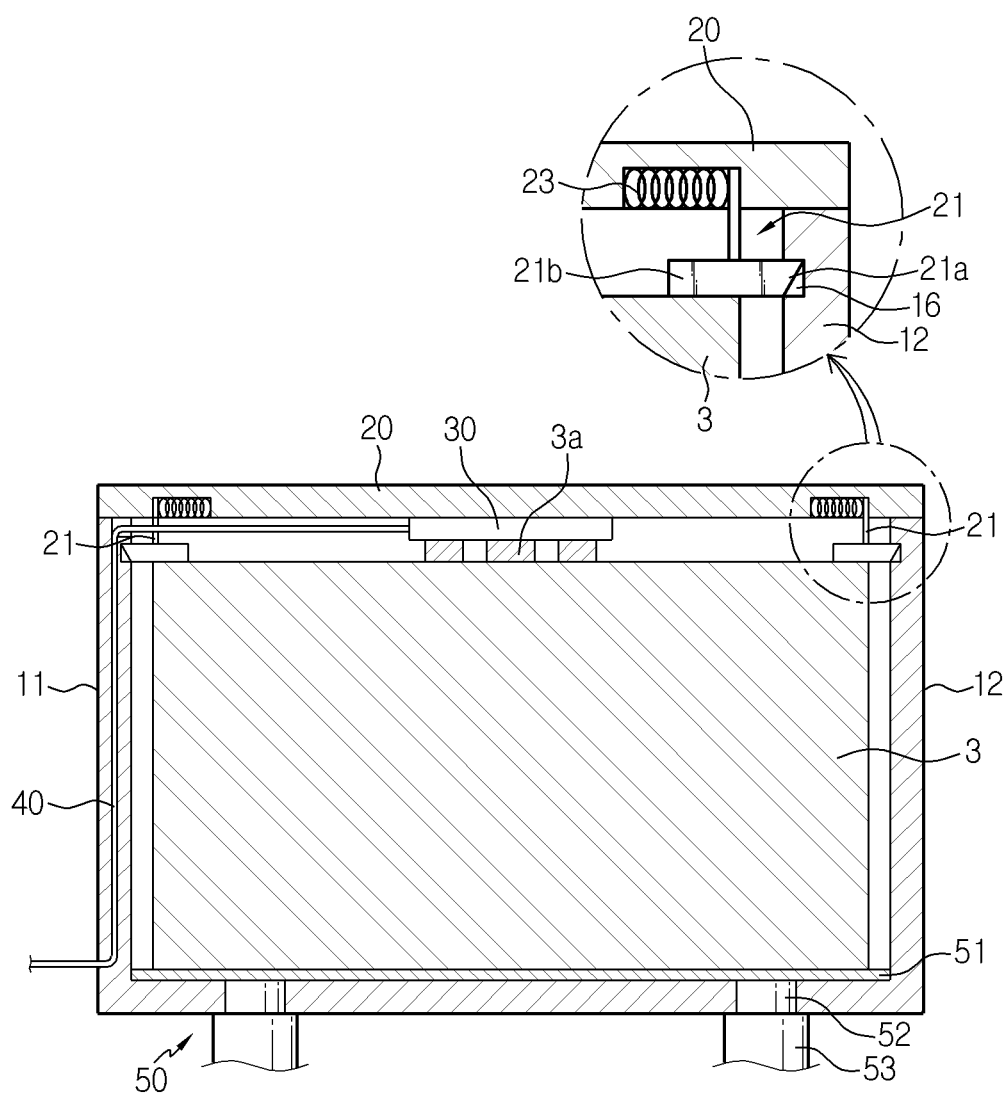
FIGS. 5 and 6 are cross-sectioned views showing an auxiliary battery storage device according to another embodiment of the present disclosure to illustrate the process of mounting or separating the case body cover and loading or unloading the auxiliary battery.
Figure 6:
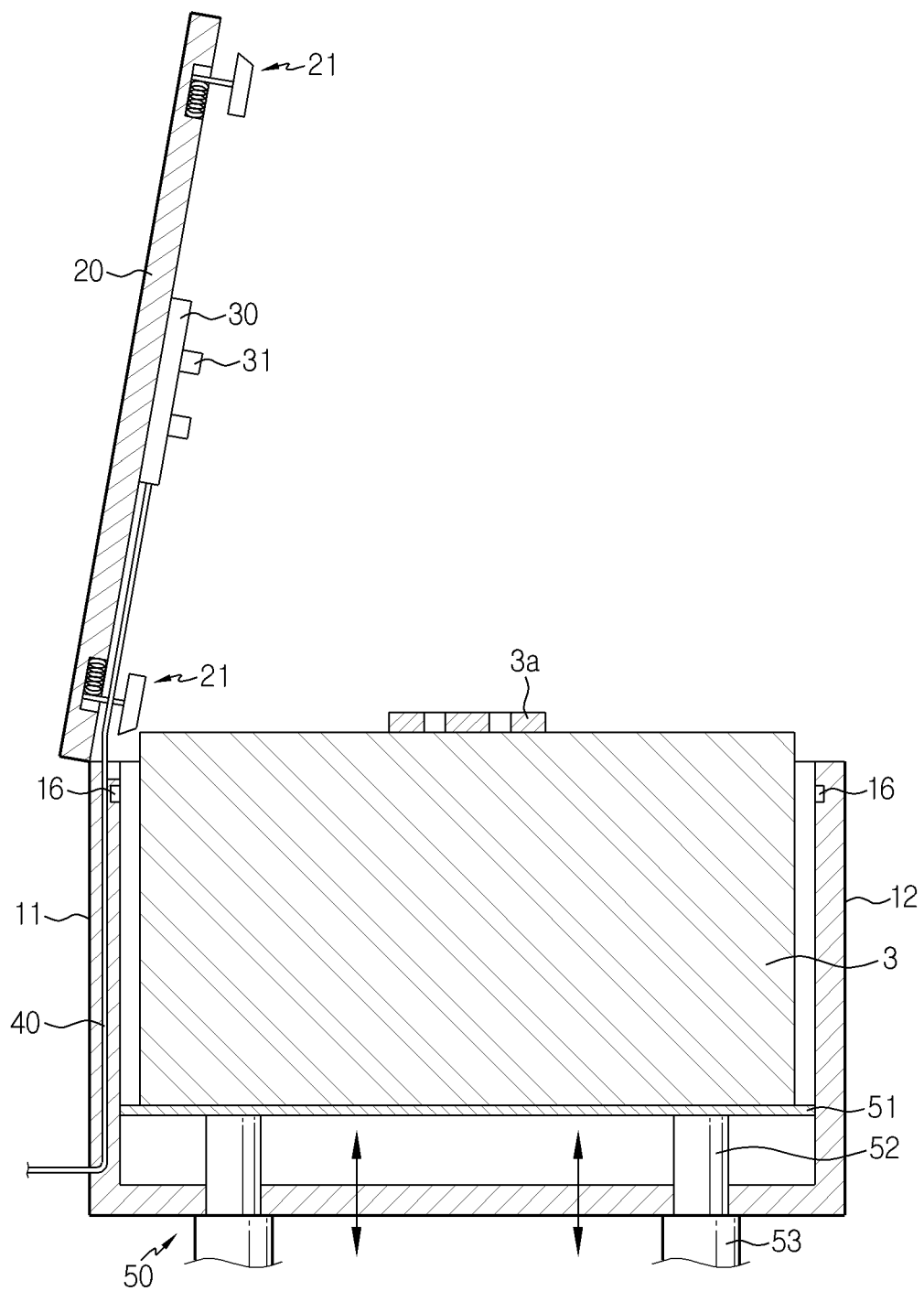
Figure 7:
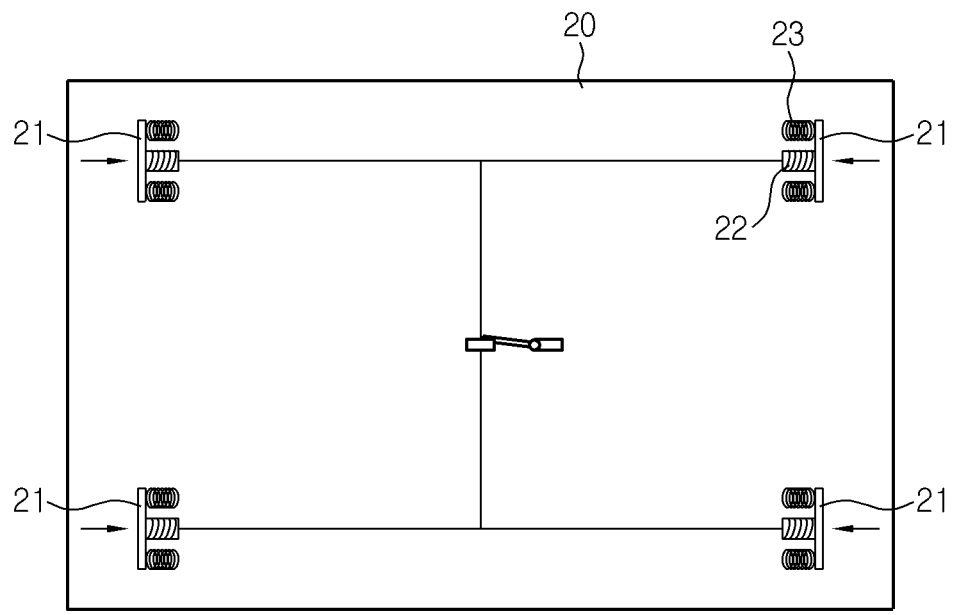
FIGS. 7 and 8 are diagrams for illustrating the states before and after a hooking protrusion of the case body cover is operated according to another embodiment of the present disclosure.
Figure 8:
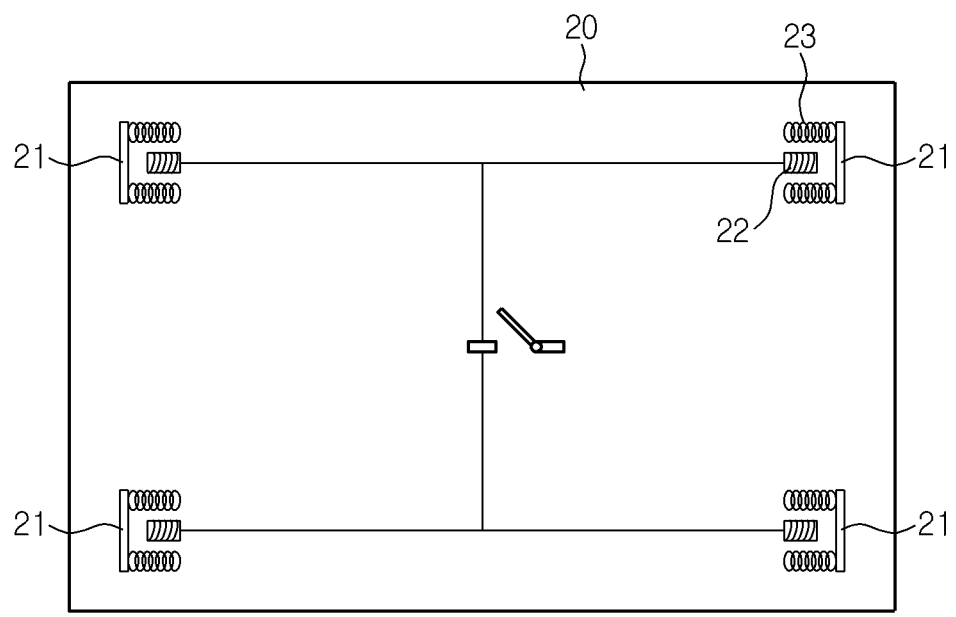

FIGS. 5 and 6 are cross-sectioned views showing an auxiliary battery storage device 5 according to another embodiment of the present disclosure to illustrate the process of mounting or separating the case body cover 20 and loading or unloading the auxiliary battery 3, and FIGS. 7 and 8 are diagrams for illustrating the states before and after a hooking protrusion 21 of the case body cover 20 is operated according to another embodiment of the present disclosure.

The auxiliary battery storage device 5 according to another embodiment of the present disclosure is configured to allow the worker to exchange the auxiliary battery 3 more conveniently than the former embodiment. In the former embodiment, when fixing the case body cover 20 and the auxiliary battery 3, the worker must directly fasten the bolt, and if there is no tool such as a spanner, the fastening force for the bolt may not be sufficient. Meanwhile, in this embodiment, the case body cover 20 and the auxiliary battery 3 may be fixed and separated by turning on/off an opening/closing button, thereby eliminating the inconvenience of the former embodiment.

As shown in FIGS. 5 and 6, hooking grooves 16 are provided at the two side plates 11, 12 of the case body 10, and hooking protrusions 21 engaging with the hooking grooves 16 are provided on the case body cover 20. The case body cover 20 may close or open the case body 10 as the hooking protrusions 21 and the hooking grooves 16 are engaged or disengaged. At this time, the hooking protrusion 21 may be configured to be horizontally movable by an electromagnetic force so as to be inserted into or released from the hooking groove 16.

As shown in FIGS. 7 and 8, the case body cover 20 of this embodiment includes an electromagnet 22 and a pair of springs 23 therein. The hooking protrusion 21 may be mounted vertically to the case body cover 20 in a state where the top end of the hooking protrusion 21 is connected to the pair of springs 23.

The pair of springs 23 may be spaced apart from each other by a predetermined distance in the width direction of the hooking protrusion, and the electromagnet may be disposed in the middle between the springs 23 while keeping a constant gap from the hooking protrusion 21. Four assemblies in which the electromagnet 22, the pair of springs 23 and the hooking protrusion 21 are combined may be assembled at four corners of the case body cover 20, respectively.

The operating mechanism of the hooking protrusion 21 will be briefly described. The electromagnet 22 is a metal rod around which a coil is wound. If an electric current flows through the coil, an electromagnetic force is generated. Thus, as shown in FIG. 7, if a switch is turned on so that a current flows through the electromagnet 22, the hooking protrusion 21 is pulled toward the electromagnet 22 and released from the hooking groove 16. Here, at least the top end of the hooking protrusion 21 is made of metal.

Conversely, as shown in FIG. 8, if the switch is turned off to cut off the current to the electromagnet 22, the hooking protrusion 21 may be elastically biased toward the hooking groove 16 by the elastic force of the spring 23 to engage with the hooking groove 16.

Even though an operation button for turning on/off the switch is conceptually depicted in the figures, the operation button may be disposed at an outer surface of the case cover 20, or the operation button may also be configured to turn the switch on/off wirelessly.

In particular, as shown in the enlarged view of FIG. 5, the hooking protrusion 21 may further include a top end mounted to the case body cover 20 in a state of being connected to the spring 23, and a jaw 21a and a stopper 21b disposed below the top end. The jaw 21a is a portion that is substantially engaged with the hooking groove 16 in the hooking protrusion 21. That is, depending on the location of the jaw 21a with respect to the hooking groove 16 by the electromagnet 22 and the spring 23, it is determined whether the case body cover 20 and the case body 10 are coupled or separated.

The stopper 21b is a portion that extends horizontally opposite to the jaw 21a. The stopper 21b may extend at least to a position at which the stopper may contact the upper surface of the auxiliary battery 3. As shown in FIG. 5, when the top portion of the case body 10 is closed by the case body cover 20, the stopper 21b supports the upper surface of the auxiliary battery 3 downward.

Since the case body cover 20 is engaged with the case body 10 and the auxiliary battery 3 is supported downward by the stopper 21b of the case body cover 20, the gap between the case body cover 20 and the auxiliary battery 3 may be kept constant. Thus, it is possible to prevent a clearance from being formed between the male connector of the case body cover 20 and the female connector of the power terminal 3a of the auxiliary battery.

Meanwhile, the auxiliary battery storage device 5 according to another embodiment of the present disclosure may further include a lifting unit 50 for supporting a lower portion of the auxiliary battery 3 and moving the auxiliary battery 3 up and down to a preset height in the inner space of the case body 10. The lifting unit 50 relieves the effort of the worker when inserting or removing the auxiliary battery 3 into/from the case body 10. In particular, if the inner space of the case body 10 has a great depth and the auxiliary battery 3 is heavy due to a very large capacity, the lifting unit 50 is very useful.

Referring to FIGS. 5 and 6, the lifting unit 50 may include a support plate 51 having a table shape and disposed to contact the lower surface of the auxiliary battery 3, a lifting rod 52 vertically connected to the support plate 51, and a driving motor 53 for moving the lifting rod 52 up and down.

The support plate 51 is formed in a plate shape sized corresponding to the lower surface of the auxiliary battery 3a and is provided to have a substantially table shape to stably support the auxiliary battery 3. A rubber pad may be further provided on the upper surface of the support plate 51 to secure adhesion with the auxiliary battery 3.

One side of the lifting rod 52 is connected to a lower portion of the support plate 51, and the other side thereof is connected to the driving motor 53 through the lower plate 13 of the case body 10. At least two lifting rods 52 may be provided to be vertically moved by the driving motor 53. For example, the lifting rod 52 may be moved up and down in a rack and pinion manner.

The driving motor 53 is a component for moving the lifting rod 52 up and down. Although not shown in detail, for example, if the driving motor 53 rotates a pinion, the pinion may move a rack corresponding to the lifting rod 52 up and down. As an alternative of the lifting unit 50 by the driving motor 53, a hydro-pneumatic actuator that generates an impellent force in the vertical direction may be used.

The driving motor 53 may be embedded under the support surface where the case body 10 may be placed. For example, a switch for operating the driving motor 53 may be placed on the side surface of the case body cover 20 or the case body 10 along with the switch for manipulating the hooking protrusion 21.

The auxiliary battery storage device 5 according to another embodiment of the present disclosure is used, it will be very easy to attach or detach the case body cover 20 to/from the case body 10, fix the case body cover 20 and the auxiliary battery 3 to each other, and load or unload the auxiliary battery 3.

The auxiliary battery storage device 5 may be applied to a vehicle such as an electric vehicle and a hybrid electric vehicle, which uses the auxiliary battery 3 or a similar fuel cell.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. An auxiliary battery storage device for storing an auxiliary battery that is used for performing cell balancing to a main battery adopted in an electric vehicle or supplying power to the main battery having a low state of charge (SOC), the auxiliary battery storage device comprising:
    a case body formed in a box shape with a top portion that is open and an inner space in which the auxiliary battery is stored, and including side plates that define the inner space;
    a case body cover coupled to the case body to open or close the top portion of the case body;
    a terminal connection member fixed to an inner surface of the case body cover to contact a power terminal of the auxiliary battery when the top portion of the case body is closed by the case body cover; and
    a power cable to extend from the terminal connection member to the main battery,
    wherein the case body has hooking grooves formed in the side plates thereof facing each other, and the case body cover has hooking protrusions engaged with the hooking grooves so that the case body and the case body cover are coupled to each other, and
    wherein each hooking protrusion includes:
        a jaw engaged with one of the hooking groove; and
        a stopper to extend opposite to the jaw, and depress downward an upper surface of the auxiliary battery.

2. The auxiliary battery storage device according to claim 1, wherein the terminal connection member includes a protruding pin provided to be connected to or disconnected from the power terminal of the auxiliary battery in a receptacle manner.

3. The auxiliary battery storage device according to claim 1, further comprising:
    a fastening member to fix the case body cover to the auxiliary battery,
    wherein the fastening member is at least one bolt that has a gripping ring at a head portion thereof and is integrally connected to the case body cover and the auxiliary battery.

4. The auxiliary battery storage device according to claim 1, wherein the case body includes a cable passage formed in at least one side plate of the side plates thereof so that the power cable passes therethrough.

5. The auxiliary battery storage device according to claim 4, wherein the case body cover is hinged to one side plate of the side plates of the case body,
    wherein the cable passage has two openings forming an entrance and an exit thereof so that the two openings are located at a top end and an outer side of the at least one side plate, and
    wherein the top end of the at least one side plate at which the opening is located is recessed compared to other regions.

6. The auxiliary battery storage device according to claim 4,
    wherein the hooking protrusions are respectively moved by an electromagnetic force to be engaged with or disengaged from the hooking grooves.

7. The auxiliary battery storage device according to claim 6, wherein the case body cover includes:
    electromagnets disposed at a position spaced apart from the hooking protrusions by a predetermined distance to pull the hooking protrusions by an electromagnetic force to be disengaged from the hooking grooves; and
    springs to elastically bias the hooking protrusions toward the hooking grooves so that the hooking protrusions are engaged with the hooking grooves.

8. The auxiliary battery storage device according to claim 1, further comprising:
a lifting unit to move the auxiliary battery up and down to a preset height in the case body.

9. The auxiliary battery storage device according to claim 8, wherein the lifting unit includes:
a support plate formed with a table shape to support the auxiliary battery inside the case body;
a lifting rod to vertically pass through a lower plate of the case body and be connected to the support plate; and
a driving motor to move the lifting rod up and down.

10. An electric vehicle, comprising the auxiliary battery storage device according to claim 1.

11. The auxiliary battery storage device according to claim 1, wherein the stopper extends horizontally from the jaw, and
wherein the jaw includes a surface that contacts a surface of the hooking groove,
wherein the stopper includes a surface to contact the auxiliary battery, and
wherein the surface of the jaw and the surface of the stopper are opposite surfaces of each hooking protrusion.

12. The auxiliary battery storage device according to claim 11, wherein the surface of the jaw and the surface of the stopper are parallel surfaces.

* * * * *